United States Patent Office 3,191,501
Patented June 29, 1965

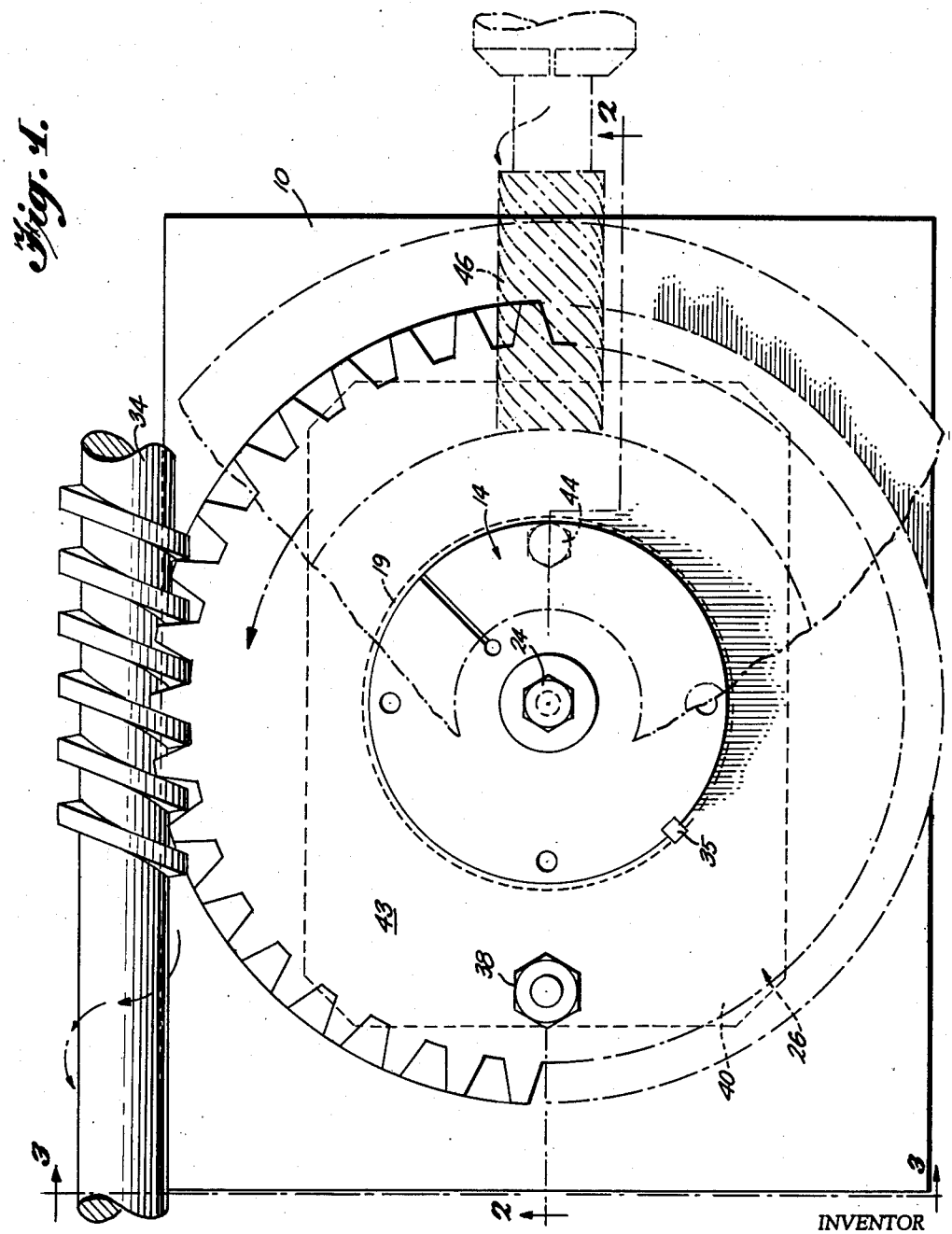

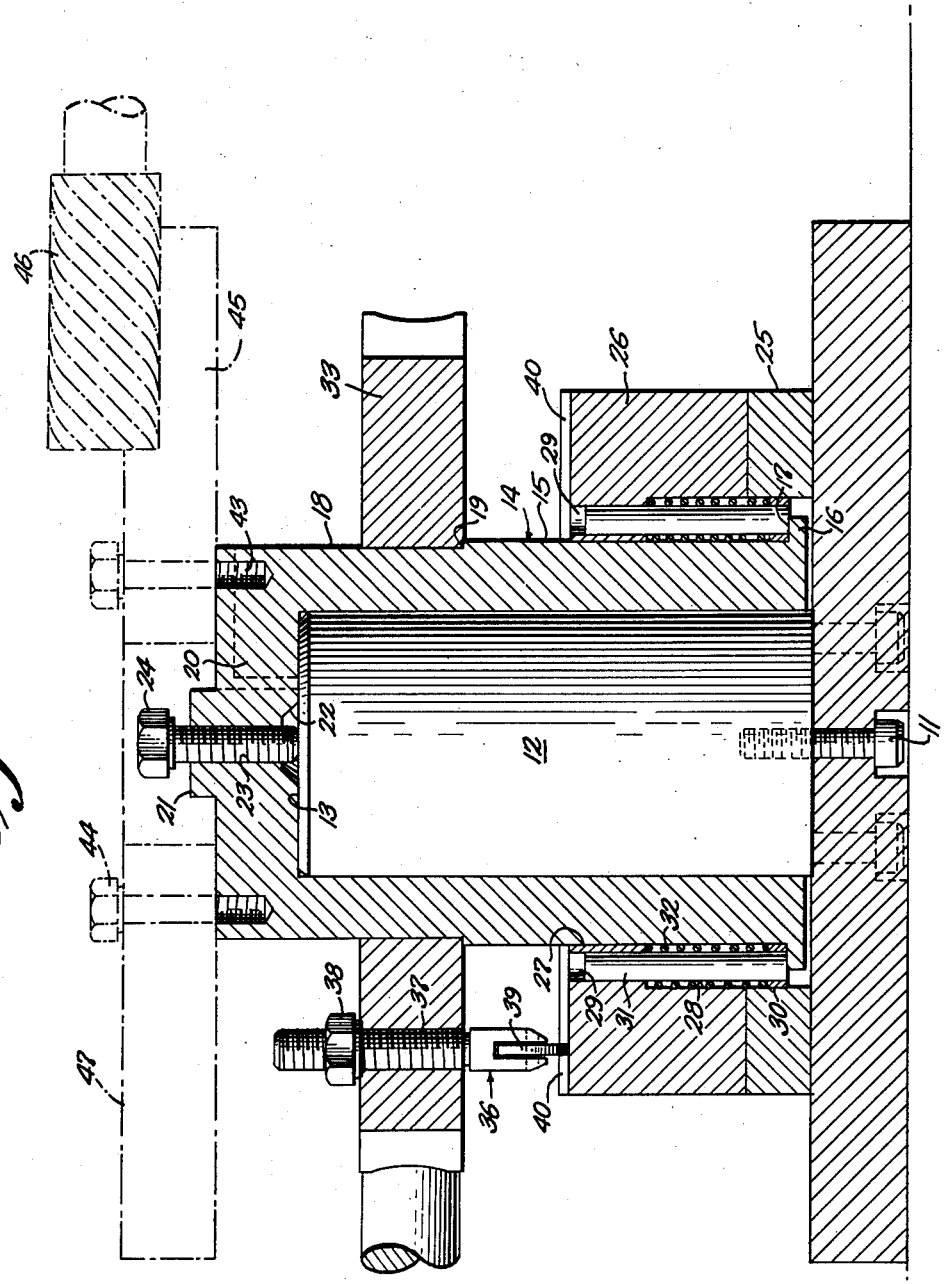

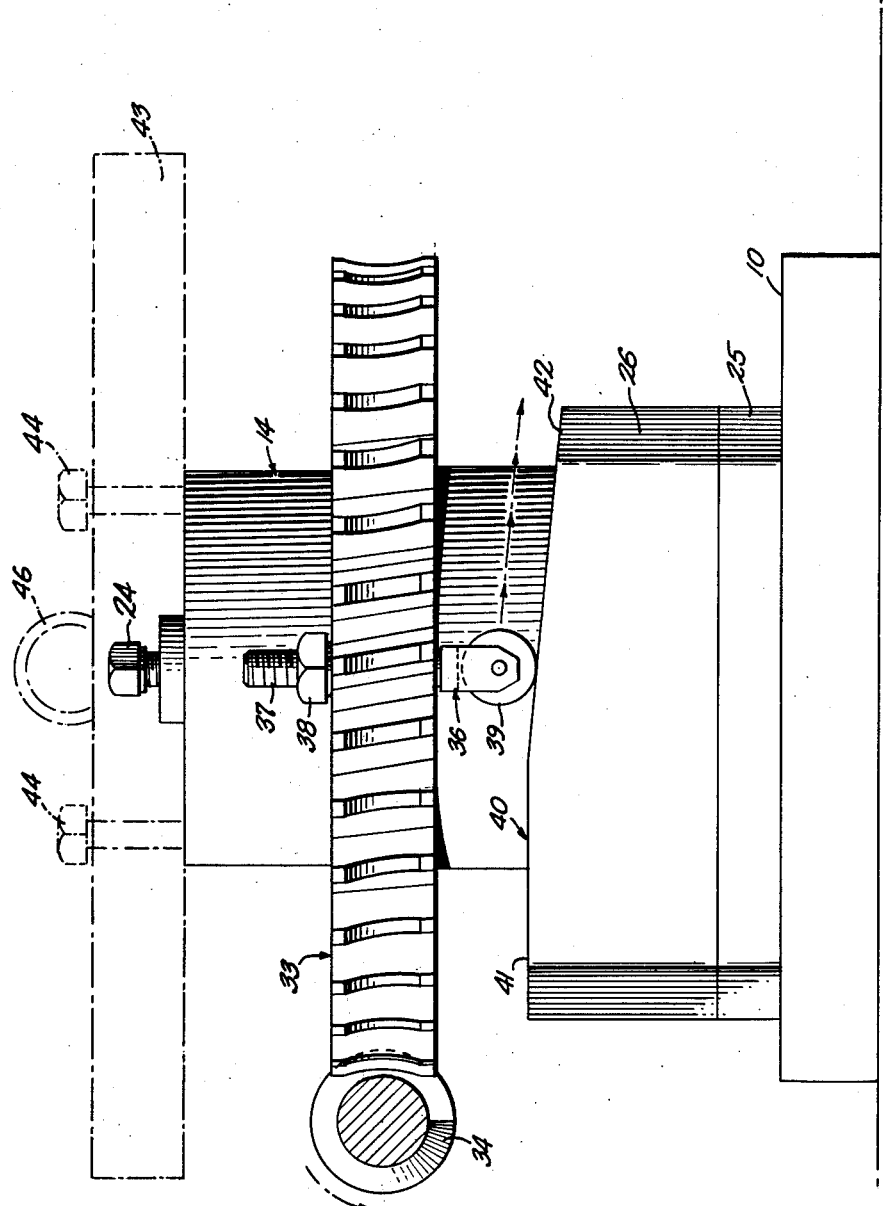

3,191,501
FIXTURE FOR MAKING CAMS
Edward T. Cech, Sr., Albuquerque, N. Mex., assignor to William Kaiser, Albuquerque, N. Mex.
Filed Sept. 13, 1963, Ser. No. 308,824
8 Claims. (Cl. 90—13.9)

This invention relates to a fixture, and mor particularly to a fixture suitable for supporting and feeding a workpiece to a rotary cutting tool for generating a cam surface having a predetermined contour on a face of the workpiece.

Generally, in the manufacture of cams from blanks, a considerable amount of time and skill has been required to machine the cam surface, which has contributed considerably to the cost of such cams. To a large extent, such machining costs have been reduced by the use of fixtures which are adapted either to rigidly support a blank of material relative to a movable cutting tool, or to support a blank and control its movement relative to a stationary cutting tool. Many of such fixtures, however, have been found to be complicated in construction, awkward or difficult to operate or expensive to manufacture.

Accordingly, it is the principal object of this invention to provide a novel fixture suitable for use with machine tools.

Another object of this invention is to provide an improved fixture for making cams.

A further object of this invention is to provide an improved fixture suitable for supporting and feeding a workpiece to a stationary rotary cutting tool for generating a cam surface having a predetermined contour on a face of the workpiece.

A still further object of this invention is to provide an improved fixture suitable for supporting and feeding a workpiece to a rotary cutting tool for generating a cam surface, having a predetermined contour, on a face of the workpiece which is adjustable so that the movement of the workpiece relative to the cutting tool can be adjusted to provide a variety of selected contours on the cam surface.

Another object of this invention is to provide an improved fixture for making cams, which is simple in construction, easy to assemble and disassemble, involves a simple operation and is inexpensive to manufacture.

Other objects and advantages of the invention will become apparent to those persons skilled in the art, from the following description when read in conjunction with the accompanying drawings, wherein:

FIGURE 1 is a top plan view of an embodiment of the invention, having portions thereof broken away, and showing the workpiece and rotary cutting tool in broken lines;

FIGURE 2 is a cross-sectional view taken along line 2—2 in FIGURE 1, showing the workpiece and the rotary cutting tool in broken lines; and FIGURE 3 is a side view of the invention, showing the workpiece and the rotary cutting tool in broken lines.

In accordance with the broad aspects of the present invention there is provided a fixture for feeding a workpiece to a rotary cutting tool for generating an annular cam surface having a predetermined contour on a face of the workpiece, generally comprising a support means, a mounting member disposed on the support means and a carrier member rotatably and axially movably mounted on the mounting member. The carrier member is provided with means for mounting the workpiece thereon so that the workpiece can be rotated and moved axially with the carrier member to feed the workpiece to an adjacent rotary cutting tool to generate a cam surface on a face of the workpiece. The carrier member is provided with means operatively connected to drive means for rotating the same, and a follower engageable with a follower surface on the support means for axially moving the workpiece in accordance with the predetermined contour of the follower surface. Stop means are provided on the carrier member for limiting the axial travel of the carrier member and the workpiece toward the follower surface on the support means, which acts to limit the engagement of the follower means with the follower surface.

Referring to the drawings, there is shown a preferred embodiment of the invention. Numeral 10 designates a base plate for supporting the various other components of the fixture. Rigidly mounted on the base plate member by means of a plurality of bolts 11 is a cylindrical post member 12, having a plane top surface 13. Telescopically mounted on the post member 12 for rotatable and axial movement is a carrier member 14 comprising a lower cylindrical portion 15, having an outwardly extending annular flange 16 at the lower end thereof, providing an annular seat 17, a cylindrical upper portion 18 of reduced diameter, providing an annular shoulder 19, and a closed upper end portion 20, having an axially disposed hub portion 21 on the upper surface thereof and an axially disposed annular recess 22 on the lower surface thereof. The upper closed end portion 20 of the carrier member is provided with an axially disposed threaded opening 23 for receiving an adjusting bolt 24. It will be appreciated that the bolt 24 can be axially adjusted, so that it will engage the top surface 13 of the post member to limit the axial travel of the carrier member relative to the post member.

Rigidly mounted on the base plate member is a lower plate member 25, having a circular opening therein for receiving the post member and carrier member therethrough. The diameter of the opening in the lower plate member is slightly greater than the diameter of the annular flange portion 16 of the carrier member. Mounted on the lower plate member 25 is a cam plate member 26 having a circular opening 27 for receiving the carrier member therethrough. The lower portion of the circular opening 27 is provided with an enlarged bore 28, having a diameter substantially the same as the circular opening in the lower plate member 25.

The cam plate member 26 is provided with a plurality of circumferentially spaced vertical openings 29 which communicate with the enlarged bore 28 in the cam plate member. A retainer ring 30 is mounted on the carrier member and seated on the annular surface 17 of the flange 16. The retainer ring is provided with a plurality of circumferentially spaced openings registrable with the openings 29 in the cam plate member for receiving a plurality of aligning pins 31 which extend into registered openings 29. Mounted on each of the aligning pins 31 is a helical spring 32 under compression interposed between the cam plate member and the retaining ring for urging the carrier member downwardly relative to the post member and the adjusting bolt 24 into engagement with the top surface 13 of the post member.

The carrier member 14 is rotated on the post member 12 by means of a gear member 33, operatively engageable with a worm gear 34 which is driven by any suitable drive means. The gear member 33 is keyed to the carrier member 14 by means of a key 35 disposed in suitable keyways in the gear member and the carrier member. As best illustrated in FIGURE 2, the gear member is seated on the annular shoulder 19 of the carrier member. The carrier member is caused to move axially relative to the post member by means of a vertically disposed follower member 36 having a threaded bolt portion 37 received in a suitable opening in the gear member, a locking nut 38 threaded on the bolt portion thereof and engageable with the top surface of the gear member, and a roller 39 disposed on the lower end of the bolt portion thereof and engageable with the upper surface of the cam plate member 26 defining a follower surface 40.

As will be noted in FIGURES 2 and 3, the helical springs 32 exert a downward force on the carrier member 14 and the gear member 33, so that the roller 39 of the follower member is urged downwardly into engagement with the follower surface 40. The follower surface can have any desired contour, although in the embodiment disclosed in the drawings, such surface includes a plane surface 41 disposed in a plane parallel to the plane of rotation of the carrier member and a plane surface 42 disposed at an angle relative to the surface 41 which intersects the axis of the carrier member.

The upper closed end 20 of the carrier member is provided with a plurality of circumferentially spaced threaded openings 43 adapted to receive bolts 44 for securing a workpiece 45 on the carrier member for rotational and axial movement therewith. As best seen in FIGURES 1 and 2, the workpiece 45 is disposed adjacent a stationary rotary cutting tool 46 and is adapted to be advanced into the cutting tool as the carrier member is rotated and moved axially to generate a cam surface on the upper face 47 of the workpiece, the contour of which is dependent upon the contour of the follower surface 40 of the cam plate member and the axial position of the adjustable limit bolt 37.

In utilizing the present invention to machine a cam surface on the face of a blank of material, a cam plate member having a follower surface 40 with the desired contour is selected and mounted on the carrier member in the manner as shown in FIGURES 2 and 3. With the other components of the fixture assembled, the workpiece 45 is secured to the top surface of the barrel member by means of the bolts 44. The entire fixture is then positioned adjacent the cutting tool similarly as illustrated in FIGURE 2. At the beginning of the machining operation, the follower preferably should be positioned on the low point of the follower surface 40 so that initially the carrier member will be moved axially upwardly to advance the workpiece into the cutting tool. As previously mentioned, the cam surface generated on the upper face of the workpiece will be determined by the contour of the follower surface which is engaged by the follower 36 as the result of the downward force exerted on the carrier member and gear member by the helical springs 32. In addition, the depth of cut of the cutting tool can be controlled by adjusting the bolt 34, which limits the downward travel of the carrier member by engaging the top surface 13 of the post member.

It will be appreciated that by selecting a cam plate member having various follower surface contours, and adjusting the axial position of the bolt 24, various cam surface contours can be generated on the upper face 47 of the workpiece. It also is possible to provide cutting tools on either or both faces of the workpiece to generate a cam surface on either one or both of the faces of the workpiece.

The embodiment of the invention illustrated in the drawings can be utilized to generate a cam surface on a workpiece having parallel high and low sectors and ascending and descending sectors adjoining the high and low sectors. This can be provided by adjusting the bolt 24 so that the roller 39 of the follower will not engage the lower portion of the inclined surface 42. With the bolt 24 thus adjusted, the gear member is driven at a predetermined speed, so that the bottom end of the bolt 24 engages the top surface of the post member 12 for an arc of travel of the follower member to provide the high sector on the cam surface being generated. After the follower has traversed such a predetermined arc of travel, the roller then engages the inclined portion of the follower surface to advance the carrier member and the workpiece upwardly into the cutting tool, thereby generating the descending sector of the cam surface. The carrier member 14 continues to move upwardly, advancing the workpiece into the cutting tool until the roller of the follower engages the surface 41 on the cam plate member. The roller then continues to traverse an arcuate path on the surface 41, generating the low sector of the cam surface until it reaches the inclined surface 42 on the opposite side of the cam plate member, when the carrier member and the workpiece are caused to move downwardly so that the ascending sector of the cam surface on the workpiece is generated.

The components of the present invention can be constructed of any suitable materials and fabricated by any suitable means. It will also be appreciated that the present invention can be used with one or more cutting tools which are stationary or move relative to the workpiece.

From the foregoing detailed description it will be evident that there are a number of changes, adaptations and modifications of the present invention which come within the province of those skilled in the art. However, it is intended that all such variations not departing from the spirit of the invention be considered as within the scope thereof as limited solely by the appended claims.

What I claim is:

1. A fixture for feeding a workpiece to a rotary cutting tool for generating an annular cam surface on a face of the workpiece comprising a support means, mounting means disposed on said support means, carrier means rotatably and axially movably mounted on said mounting means, said support means having a follower surface having a predetermined contour, follower means engageable with said follower surface on said support means mounted on said carrier means, means disposed on said fixture for urging said follower means into engagement with said follower surface on said support means, said carrier means having stop means for limiting the axial travel thereof toward said follower surface, means for rotating said carrier means and means for mounting said workpiece on said carrier means adjacent said cutting tool.

2. A fixture for feeding a workpiece to a rotary cutting tool and the like for generating an annular cam surface on a face of a workpiece comprising a support means, mounting means disposed on said support means, carrier means rotatably and axially movably mounted on said mounting means, a plate member mounted on said support means surrounding said carrier means, said plate member having a follower surface having a predetermined contour, follower means engageable with said follower surface on said plate member mounted on said carrier means, biasing means interposed between said plate member and said carrier member for urging said follower means into engagement with said follower surface on said plate member, said carrier means having stop means for limiting the axial travel thereof toward said follower surface, means for rotating said carrier means and means for securing said workpiece on said carrier means adjacent said cutting tool.

3. A fixture for feeding a workpiece to a rotary cutting tool and the like for generating an annular cam surface on a face of the workpiece comprising a support means, a mounting member disposed on said support means, a carrier member rotatably and axially movably mounted on said mounting member, a plate member mounted on said support means surrounding said carrier means, said plate member having a first top plane surface disposed parallel to the plane of rotation of said carrier means and a second top plane surface disposed at a predetermined angle relative to said first plane surface, follower means engageable with said top plane surfaces of said plate member, biasing means interposed between said plate member and said carrier member for urging said follower means into engagement with said top plane surfaces of said plate member, said carrier means having stop means for limiting the axial travel thereof toward said plane surfaces, means for rotating said carrier member and means for securing said workpiece on said carrier means adjacent said cutting tool.

4. A fixture for feeding a workpiece to a rotary cutting tool and the like for generating an annular cam surface on a face of the workpiece comprising a base plate member, a cylindrical post member mounted on said base plate member, a carrier member having a cylindrical portion and a closed upper end portion rotatably and axially movably mounted on said post member, said carrier member having an outwardly projecting annular flange disposed at the lower end thereof, a retainer ring having a plurality of circumferentially spaced openings mounted on the cylindrical portion of said carrier member and seated on the annular flange thereof, a cam plate member mounted on said base plate member and surrounding said carrier member, said cam plate member having a plurality of circumferentially spaced openings registrable with said openings in said retainer ring, aligning pins disposed in registered openings in said cam plate member and said retainer ring, said cam plate member having a top surface defining a follower surface having a predetermined contour, follower means engageable with the follower surface of said cam plate member mounted on said carrier member, each of said aligning pins having a helical spring under compression mounted thereon and interposed between said cam plate member and said retainer ring for urging said follower means into engagement with said follower surface, said carrier member having stop means for limiting the axial travel thereof toward said follower surface, means for rotating said carrier member and means for securing said workpiece on said carrier member adjacent said cutting tool.

5. A fixture for feeding a workpiece to a rotary cutting tool and the like for generating an annular cam surface on a face of the workpiece comprising a base plate member, a cylindrical post member mounted on said base plate member, a cylindrical carrier member having a closed upper end rotatably and axially movably mounted on said post member, said carrier member having an outwardly projecting annular flange disposed at the lower end thereof, a retainer ring having a plurality of circumferentially spaced openings mounted on said carrier member and seated on the annular flange thereof, a cam plate member mounted on said base plate member surrounding said carrier member, said cam plate member having an enlarged bore in a bottom face thereof, said cam plate member having a plurality of circumferentially spaced openings communicating with said enlarged bore therein and registrable with said openings in said retainer ring, aligning pins disposed in registered openings in said cam plate member and said retainer ring, said cam plate member having a first top plane surface disposed parallel to the plane of rotation of said carrier member and a second top plane surface disposed at a predetermined angle relative to said first plane surface, follower means engageable with said top plane surfaces of said cam plate member mounted on said carrier member, each of said aligning pins having a helical spring under compression mounted thereon and interposed between the bottom wall of said enlarged bore in said cam plate member and said retainer ring for urging said follower means into engagement with said top plane surfaces, said carrier member having stop means engageable with said post member for limiting the axial travel thereof toward said post member, means for rotating said carrier member and means for securing said workpiece on said carrier member adjacent said cutting tool.

6. A fixture for feeding a workpiece to a rotary cutting tool and the like for generating an annular cam surface on a face of the workpiece comprising a base plate member, a cylindrical post member rigidly mounted on said base plate member, a cylindrical carrier member having a closed upper end rotatably and axially movably mounted on said post member, said carrier member having an outwardly projecting annular flange disposed at the lower end thereof, a retainer ring having a plurality of circumferentially spaced openings mounted on said carrier member and seated on the annular flange thereof, a cam plate member having a circular opening for receiving said carrier member therethrough mounted on said base plate member, said cam plate member having an enlarged bore in the bottom face thereof, said cam plate member having a plurality of circumferentially spaced openings communicating with said enlarged bore therein and registrable with said openings in said retainer ring, aligning pins disposed in registered openings in said cam plate member and said retainer ring, said cam plate member having a first top plane surface disposed parallel to the plane of rotation of said carrier member and a second top plane surface disposed at a predetermined angle relative to said first plane surface and intersecting the axis of said post member, follower means engageable with at least a portion of said top plane surfaces of said cam plate member, each of said aligning pins having a helical spring under compression mounted thereon and interposed between the bottom wall of said enlarged bore in said cam plate member and said retainer ring for urging said follower means into engagement with said top plane surfaces, said carrier member having axially adjustable stop means engageable with said post member for limiting the axial travel thereof toward said top plane surfaces of said cam plate member, means for rotating said carrier member and means for securing said workpiece on said carrier member adjacent said cutting tool.

7. A fixture for feeding a workpiece to a rotary cutting tool and the like for generating an annular cam surface on a face of the workpiece comprising a base plate member, a cylindrical post member rigidly mounted on said base plate member, a cylindrical carrier member having a closed upper end rotatably and axially movably mounted on said post member, said carrier member having an outwardly projecting annular flange disposed at the lower end thereof, a retainer ring having a plurality of circumferentially spaced openings mounted on said carrier member and seated on the annular flange thereof, a cam plate member having a circular opening for receiving said carrier member therethrough, said cam plate member having an enlarged bore in the bottom face thereof, said cam plate member having a plurality of circumferentially spaced openings communicating with said enlarged bore therein and registrable with said openings in said retainer ring, aligning pins disposed in registered openings in said cam plate member and said retainer ring, said cam plate member having a top surface defining a follower surface having a predetermined contour, axially adjustable follower means engageable with said follower surface, each of said aligning pins having a helical spring under compression mounted thereon and interposed between the upper wall of said enlarged bore in said cam plate member and said retainer ring for urging said follower means into engagement with said follower surface, said carrier member having axially adjustable stop means engageable with said post member for limiting the axial travel thereof toward said follower surface of said cam plate member, means for rotating said carrier member and means for securing said workpiece on said carrier member adjacent said cutting tool.

8. A fixture for feeding a workpiece to a rotary cutting tool and the like for generating an annular cam surface on a face of a workpiece comprising a base plate member, a cylindrical post member having a flat top surface mounted on said base plate member, a carrier member having a cylindrical portion and a closed end portion telescopically mounted on said post member for rotatable and axial movement thereon, the cylindrical portion of said carrier member having an outwardly projecting annular flange disposed at the lower open end thereof, a retainer ring having a plurality of circumferentially spaced openings mounted on the cylindrical portion of said carrier member and seated on the annular portion thereof, a cam plate member having a circular opening for receiving said carrier member therethrough mounted on said base plate member, said cam plate member having an enlarged bore in the bottom face thereof, said cam plate member having a plurality of circumferentially spaced openings communicating with said enlarged bore therein and registrable with said openings in said retainer ring, aligning pins disposed in registered openings in said cam plate member and said retaining ring, said cam plate member having a first top plane surface disposed parallel to the plane of rotation of said carrier member and a second top plane surface disposed at a predetermined angle relative to said first plane surface and intersecting the axis of said post member, a gear member operatively engageable with a drive transmitting means mounted on said carrier member, said gear member having a threaded opening disposed above said stop plane surfaces of said cam plate member, a follower having a roller mounted on the lower end thereof engageable with said top plane surfaces threaded in said threaded opening in said gear member, each of said aligning pins having a helical spring under compression mounted thereon and interposed between the top wall of said enlarged bore in said cam plate member and said retainer ring for urging said roller of said follower member into engagement with said top plane surfaces, said closed end portion of said carrier member having an axially disposed threaded opening, a stop member threadedly disposed in said threaded opening in the closed end portion of said carrier member and said carrier member having means for securing said workpiece on the closed end portion thereof.

References Cited by the Examiner

UNITED STATES PATENTS

| | | | |
|---|---|---|---|
| 2,386,973 | 10/45 | Mieth | 90—13.9 |
| 2,435,900 | 2/48 | Perez | 90—13.9 X |
| 2,962,941 | 12/60 | Stein et al. | 90—13.9 |

FOREIGN PATENTS 547,007   8/56   Italy.

WILLIAM W. DYER, Jr., *Primary Examiner.*

LEON PEAR, *Examiner.*